US012789672B2

(12) United States Patent
Kim et al.

(10) Patent No.: US 12,789,672 B2
(45) Date of Patent: Nov. 10, 2026

(54) VEHICLE SEATS AND METHODS FOR PROMOTING ACCESS TO A VEHICLE

(71) Applicant: GM GLOBAL TECHNOLOGY OPERATIONS LLC, Detroit, MI (US)

(72) Inventors: Jinyoung Kim, Gunpo-si (KR); Bokyeong Moon, Bupyeong-gu (KR); Jinsup Kim, Incheon (KR); Bongbum Back, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 388 days.

(21) Appl. No.: 18/404,212

(22) Filed: Jan. 4, 2024

(65) Prior Publication Data

US 2025/0222833 A1 Jul. 10, 2025

(51) Int. Cl.

| | |
|---|---|
| ***B60N 2/02*** | (2006.01) |
| ***B60N 2/005*** | (2006.01) |
| ***B60N 2/24*** | (2006.01) |

(52) U.S. Cl.

CPC ............. *B60N 2/0256* (2023.08); *B60N 2/02* (2013.01); *B60N 2/02246* (2023.08); *B60N 2/0237* (2023.08); *B60N 2/005* (2013.01); *B60N 2002/022* (2013.01); *B60N 2/02253* (2023.08); *B60N 2/245* (2013.01)

(58) Field of Classification Search

CPC .... B60N 2/005; B60N 2/02; B60N 2002/022; B60N 2/0256; B60N 2/245

See application file for complete search history.

(56) References Cited

U.S. PATENT DOCUMENTS

| | | | | |
|---|---|---|---|---|
| 4,802,706 A * | 2/1989 | Onimaru | B60N 2/0277 108/140 |
| 5,474,353 A | 12/1995 | Koester et al. | |
| 7,438,339 B2 * | 10/2008 | Abraham | B60N 2/3018 296/65.09 |
| 9,718,378 B2 * | 8/2017 | Schulz | B60N 2/0244 |
| 10,336,216 B2 * | 7/2019 | Slungare | B60N 2/245 |

(Continued)

FOREIGN PATENT DOCUMENTS

| | | |
|---|---|---|
| DE | 102017218784 A1 | 4/2018 |
| JP | H0212098 Y2 | 4/1990 |

(Continued)

*Primary Examiner* — Joshua J Michener
*Assistant Examiner* — Nevena Aleksic
(74) *Attorney, Agent, or Firm* — Ingrassia Fisher & Lorenz, LLP | IFL

(57) ABSTRACT

Vehicle seats, vehicles including the vehicle seats, and methods of promoting ease of access to the vehicles are provided. The vehicle seats include a frame coupled to a floor of a vehicle, the vehicle having a front, a rear, and oppositely disposed sides, a seatback coupled to the frame and configured to support a back of an individual while the individual is sitting on the vehicle seat, and a seat cushion coupled to the frame and configured to support the individual while the individual is sitting on the vehicle seat. The seat cushion includes a front portion movably coupled to the frame and a rear portion disposed in a fixed position between the front portion and the seatback. The front portion is configured to selectively move from a driving position to a boarding position by moving the front portion on the frame toward a first side of the vehicle.

20 Claims, 10 Drawing Sheets

(56) References Cited

U.S. PATENT DOCUMENTS

| | | | | |
|---|---|---|---|---|
| 10,640,017 | B2 * | 5/2020 | Murakami | B60N 2/0705 |
| 10,675,994 | B2 * | 6/2020 | Fitzpatrick | B60N 2/14 |
| 11,919,424 | B2 * | 3/2024 | Lee | B60N 2/06 |
| 12,344,134 | B2 * | 7/2025 | Mizuno | B60N 2/06 |
| 2007/0164592 | A1 * | 7/2007 | Gerhardt | B60N 2/02246 297/344.23 |
| 2007/0284905 | A1 * | 12/2007 | Bailey | B60N 2/14 296/65.07 |
| 2011/0109114 | A1 * | 5/2011 | Kolpasky | B60N 2/01 297/344.21 |
| 2012/0169099 | A1 * | 7/2012 | Horiguchi | B60N 2/164 297/314 |
| 2015/0375638 | A1 * | 12/2015 | Farooq | B60N 2/06 296/65.18 |
| 2019/0111809 | A1 | 4/2019 | He | |

FOREIGN PATENT DOCUMENTS

| | | | |
|---|---|---|---|
| JP | 2014019212 | A | 2/2014 |
| JP | 2018052222 | A | 4/2018 |

* cited by examiner

VEHICLE SEATS AND METHODS FOR PROMOTING ACCESS TO A VEHICLE

INTRODUCTION

The technical field generally relates to vehicle seats, and more particularly relates to a vehicle seat having a cushion that is configured to swivel toward a door of the vehicle to promote ease of access to the vehicle.

People with disabilities or restricted mobility might encounter difficulties when getting in and out of a vehicle. For instance, those who rely on wheelchairs may find it challenging to move from the wheelchair to the vehicle seat, partly because of the gap between the two.

Accordingly, it is desirable to provide systems and methods for promoting ease of access to a vehicle, especially for people with disabilities or limited mobility. Furthermore, other desirable features and characteristics of the present disclosure will become apparent from the subsequent detailed description and the appended claims, taken in conjunction with the accompanying drawings and the foregoing introduction.

SUMMARY

A method is provided for promoting ease of access to a vehicle that has a front, a rear, and oppositely disposed sides. In one example, the method includes transitioning a front portion of a seat cushion of a vehicle seat from a driving position to a boarding position, wherein the seat cushion is coupled to a frame and the frame is coupled to a floor of the vehicle, wherein transitioning the front portion includes moving the front portion on the frame toward a first side of the sides of the vehicle, supporting an individual with the front portion of the seat cushion while the individual is sitting thereon and while the front portion is in the boarding position, transitioning the front portion of the seat cushion from the boarding position to the driving position by moving the front portion of the seat cushion on the frame away from the first side of the vehicle, and supporting the individual with the front portion of the seat cushion, a rear portion of the seat cushion, and a seatback of the vehicle seat while the individual is sitting on the seat cushion and while the front portion is in the driving position, wherein the rear portion of the vehicle seat is disposed in a fixed position between the front portion of the seat cushion and the seatback.

In various examples, the front portion of the seat cushion is entirely within the vehicle while the front portion is in the driving position, and the front portion of the seat cushion is at least partially outside of the vehicle while the front portion is in the boarding position.

In various examples, transitioning the front portion of the seat cushion from the driving position to the boarding position and transitioning the front portion of the seat cushion from the boarding position to the driving position are both motorized processes initiated by actuation of a motor switch positioned on the vehicle seat.

In various examples, transitioning the front portion of the seat cushion from the driving position to the boarding position and transitioning the front portion of the seat cushion from the boarding position to the driving position are both motorized processes initiated by actuation of a button on a key fob of the vehicle.

In various examples, transitioning the front portion of the seat cushion from the boarding position to the driving position is performed while the individual is sitting on the front portion.

In various examples, the method includes transitioning the front portion of the seat cushion from the driving position to the boarding while the individual is sitting on the front portion, determining, with one or more processors of a controller onboard the vehicle, that the individual is no longer sitting on the front portion, and automatically transitioning the front portion of the seat cushion from the boarding position to the driving position.

In various examples, the method includes switching a gear system of the vehicle seat from a first arrangement configured for transitioning the front portion of the vehicle seat between the driving position and the boarding position to a second arrangement configured for adjusting a height of the seat cushion relative to the floor of the vehicle.

In various examples, transitioning the front portion of the seat cushion from the driving position to the boarding position includes moving the front portion on the frame along a curved path of travel.

A vehicle seat is provided for promoting ease of access to a vehicle. In one example, the vehicle seat includes a frame coupled to a floor of a vehicle, the vehicle having a front, a rear, and oppositely disposed sides, a seatback coupled to the frame and configured to support a back of an individual while the individual is sitting on the vehicle seat, and a seat cushion coupled to the frame and configured to support the individual while the individual is sitting on the vehicle seat. The seat cushion includes a front portion movably coupled to the frame and a rear portion disposed in a fixed position between the front portion and the seatback. The front portion is configured to selectively move from a driving position to a boarding position by moving the front portion on the frame toward a first side of the sides of the vehicle.

In various examples, the front portion of the seat cushion is configured to be disposed entirely within the vehicle while the front portion is in the driving position, wherein the front portion of the seat cushion is configured to be disposed at least partially outside of the vehicle while the front portion is in the boarding position.

In various examples, the vehicle seat includes a motorized gear system configured to move the front portion on the frame between the driving position and the boarding position, and a motor switch configured to initiate the motorized gear system.

In various examples, the vehicle seat includes a motorized gear system configured to move the front portion on the frame between the driving position and the boarding position, and a key fob of the vehicle configured to initiate the motorized gear system.

In various examples, the front portion of the seat cushion is configured to transition between the boarding position and the driving position while the individual is sitting on the front portion.

In various examples, the vehicle seat includes a sensor configured to sense whether the individual is sitting on the front portion of the seat cushion, and a controller configured to, by one or more processors: determine that the individual was sitting on the front portion of the seat cushion while the front portion transitioned from the driving position to the boarding position, determine that the individual is no longer sitting on the front portion while the front portion is in the boarding position, and automatically transitioning the front portion of the seat cushion from the boarding position to the driving position.

In various examples, the vehicle seat includes a motorized gear system configured to operate in a swivel mode to move the front portion on the frame between the driving position and the boarding position and operate in a height adjustment mode to move the seat cushion toward or away from the floor of the vehicle, and a motor switch configured to initiate the motorized gear system.

In various examples, the front portion of the seat cushion is configured to transition from the driving position to the boarding position by moving on the frame along a curved path of travel.

A vehicle is provided that, in one example, includes a body having a cabin defined between a front, a rear, and oppositely disposed sides, a floor, and a roof of the body, at least one door that provides access to the cabin of the body, and a vehicle seat. The vehicle seat includes a frame coupled to the floor of the body, a seatback coupled to the frame and configured to support a back of an individual while the individual is sitting on the vehicle seat, and a seat cushion coupled to the frame, configured to support the individual while the individual is sitting on the vehicle seat, and that includes a front portion movably coupled to the frame and a rear portion disposed in a fixed position between the front portion and the seatback, and a motorized gear system configured to selectively move the front portion on the frame from a driving position to a boarding position by moving the front portion on the frame toward a first side of the sides of the vehicle.

In various examples, the vehicle includes a motor switch positioned on the vehicle seat configured to initiate the motorized gear system and a key fob configured to initiate the motorized gear system.

In various examples, the vehicle includes a sensor configured to sense whether the individual is sitting on the front portion of the seat cushion and a controller configured to, by one or more processors: determine that the individual was sitting on the front portion of the seat cushion while the front portion transitioned from the driving position to the boarding position, determine that the individual is no longer sitting on the front portion while the front portion is in the boarding position, and automatically transitioning the front portion of the seat cushion from the boarding position to the driving position.

In various examples, the motorized gear system is configured to operate in a swivel mode to move the front portion on the frame between the driving position and the boarding position and operate in a height adjustment mode to move the seat cushion toward or away from the floor of the vehicle. The vehicle includes a shifting switch configured to switch the motorized gear system between the swivel mode and the height adjustment mode.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an example of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
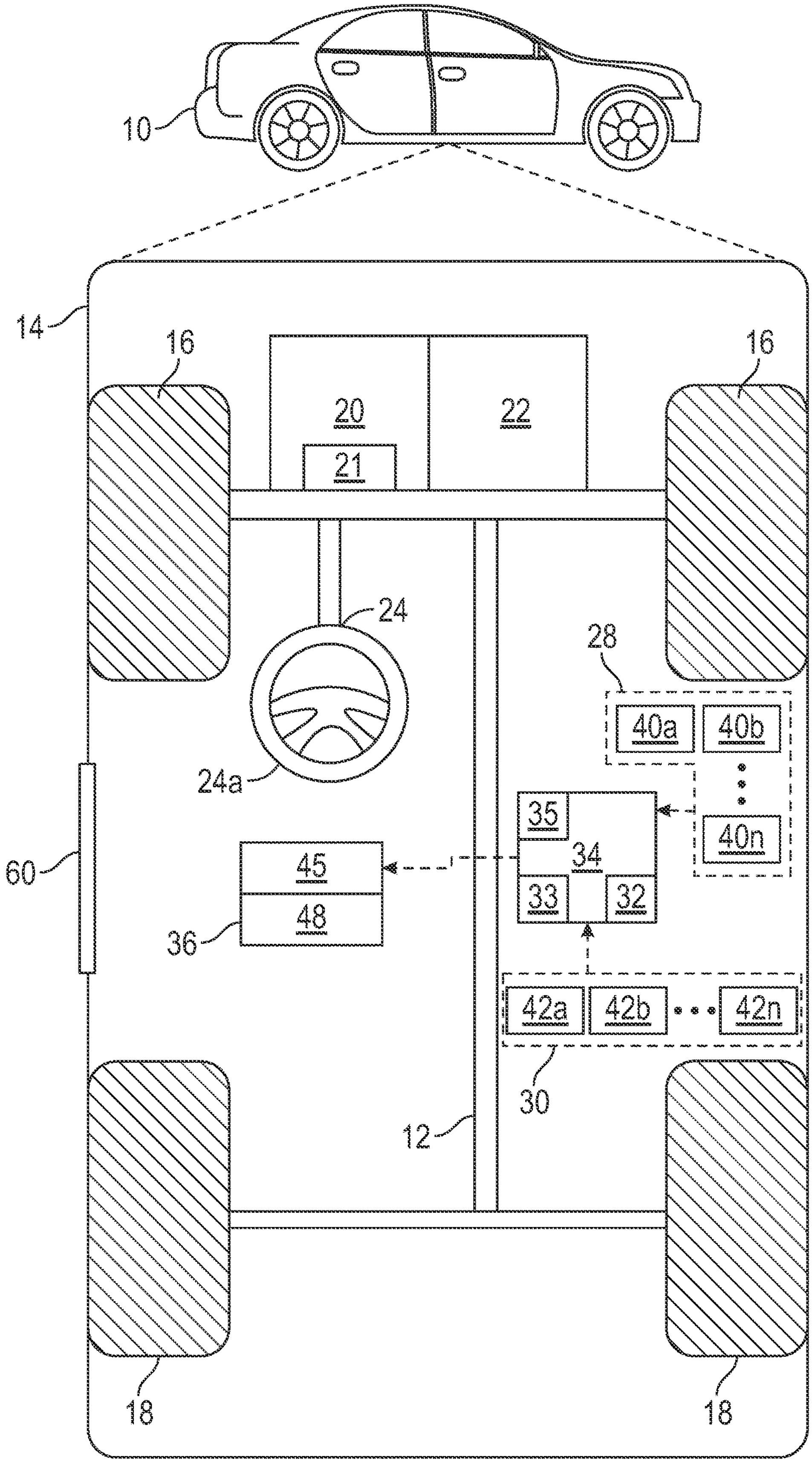
FIG. 1 is a functional block diagram of a vehicle that includes a seat with a cushion configured to swivel in accordance with an example.

FIG. 1 illustrates a vehicle 10, according to an example. In certain examples, the vehicle 10 comprises an automobile. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. At least one door 60 is provided that may be opened to provide access to an interior cabin of the vehicle 10 through a door opening. The wheels 16-18 are each rotationally coupled to the chassis 12 near a respective corner of the body 14. For convenience, the vehicle 10 is referred to herein as having a front, a rear, and oppositely disposed sides.

The vehicle 10 further includes a propulsion system 20, a transmission system 22, a steering system 24, a sensor system 28, an actuator system 30, at least one data storage device 32, at least one controller 34, and a seat 36. The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences a position of the wheels 16-18. While depicted as including a steering wheel 24*a* for illustrative purposes, in some examples contemplated within the scope of the present disclosure, the steering system 24 may not include a steering wheel.

The sensor system 28 includes one or more sensing devices 40*a*-40*n* that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40*a*-40*n*. The sensing devices 40*a*-40*n* may include, but are not limited to, current sensors, voltage sensors, temperature sensors, motor speed sensors, position sensors, etc.

The actuator system 30 includes one or more actuator devices 42*a*-42*n* that control one or more vehicle features such as, but not limited to, the propulsion system 20, the transmission system 22, and/or the steering system 24.

The controller 34 includes at least one processor 33, a communication bus 32, and a computer readable storage device or media 35. The processor 33 performs the computation and control functions of the controller 34. The processor 33 may be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 35 may include volatile and nonvolatile storage in read-only memory (ROM), random-access memory (RAM), and keep-alive memory (KAM), for example. KAM is a persistent or non-volatile memory that may be used to store various operating variables while the processor 33 is powered down. The computer-readable storage device or media 35 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 32 serves to transmit programs, data, status and other information or signals between the various components of the vehicle 10. The bus 32 may be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 33, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 may include any number of controllers 34 that communicate over any suitable communication medium or a combination of communication mediums and that cooperate to process the sensor signals, perform logic, calculations, methods, and/or algorithms, and generate data.

As may be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 33) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems.

The seat 36 may include a frame 50 secured to a floor of the vehicle 10, a seat cushion 45 coupled to the frame 50, a seatback 48 secured at a lower end thereof to the frame 50, and a headrest 54 secured to an upper end of the seatback 48. The seat cushion 45 may be configured to support an occupant seated thereon, the seatback 48 may be configured to support the occupant's back while seated on the seat cushion 45, and the headrest 54 may be configured to support the occupant's head. The seat 36 may include various components that provide for adjustment of the seat 36, such as systems for adjusting a height of the seat 36 relative to the floor of the vehicle 10, a recline angle of the seatback 48, lumbar support, and a height of the headrest 54 relative to an upper end of the seatback 48.

The seat 36 is configured to promote ease of access to the vehicle 10, for example, by an individual entering the vehicle 10 through a door opening from a seated position on a wheelchair or otherwise having limited mobility. In particular, the seat 36 is configured to selectively move at least a portion of the seat cushion 45 toward a side of the vehicle 10 such that a distance between the individual outside of the door opening and the moved portion of the seat cushion 45 is reduced.

Figure 2:
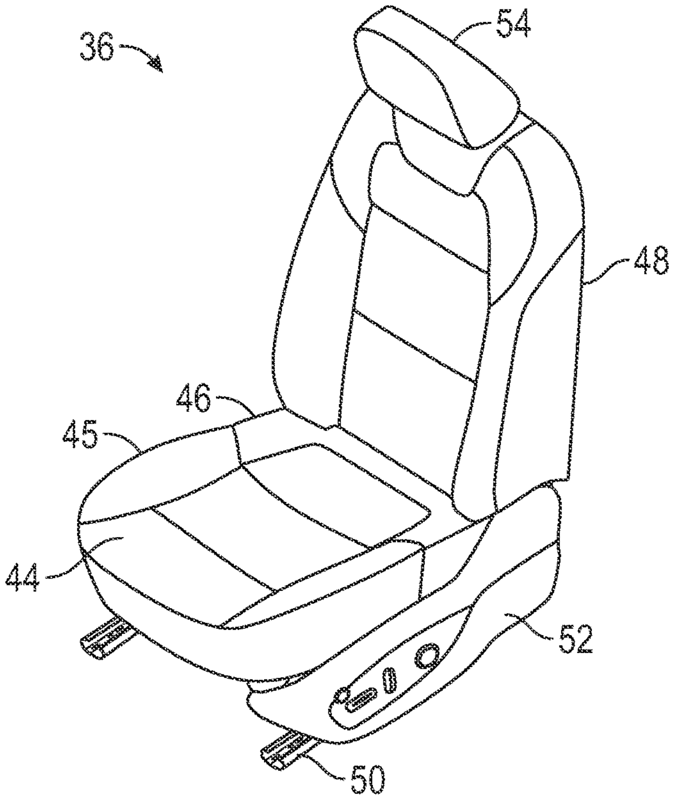
FIGS. 2 and 3 are perspective views of the seat of FIG. 1 with a seat cushion thereof in a driving position and a boarding position, respectively, in accordance with an example.
Figure 3:
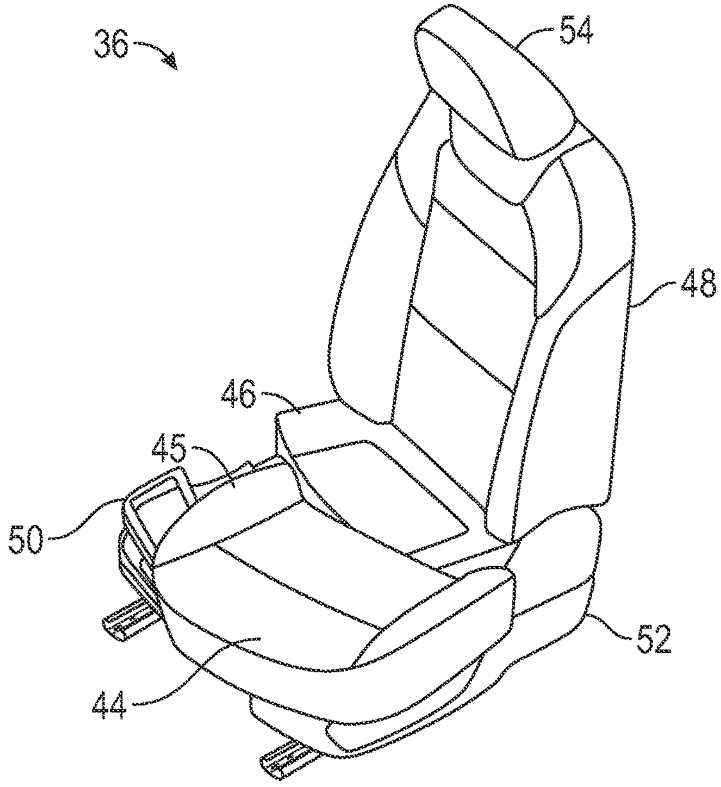

Referring now to FIGS. 2-14, a nonlimiting example of the seat 36 is presented that includes the seat cushion 45 and the seatback 48 each coupled to the frame 50. The seat cushion 45 includes a front portion 44 movably coupled to the frame 50 and a rear portion 46 fixed to the frame 50. The rear portion 46 is disposed between the front portion 44 and the seatback 48. The seat 36 is configured to selectively move the front portion 44 from a driving position to a boarding position by moving the front portion 44 on the frame 50 toward a first side of the vehicle 10 (e.g., toward the door opening of the door 60) while the rear portion 46 remains in a fixed position. For example, FIGS. 2 and 4 illustrate the front portion 44 in the driving position and FIGS. 3 and 5 illustrate the front portion 44 in the boarding position.

Figure 4:
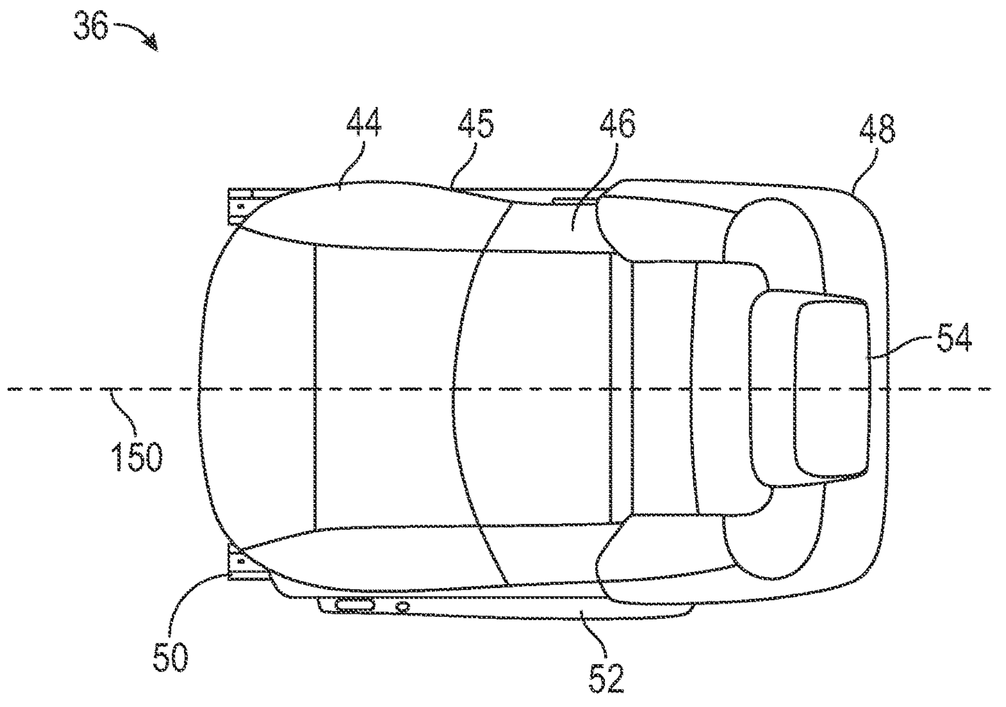
FIGS. 4 and 5 are top views of the seat of FIGS. 1-3 with the seat cushion thereof in the driving position and the boarding position, respectively, in accordance with an example.
Figure 5:
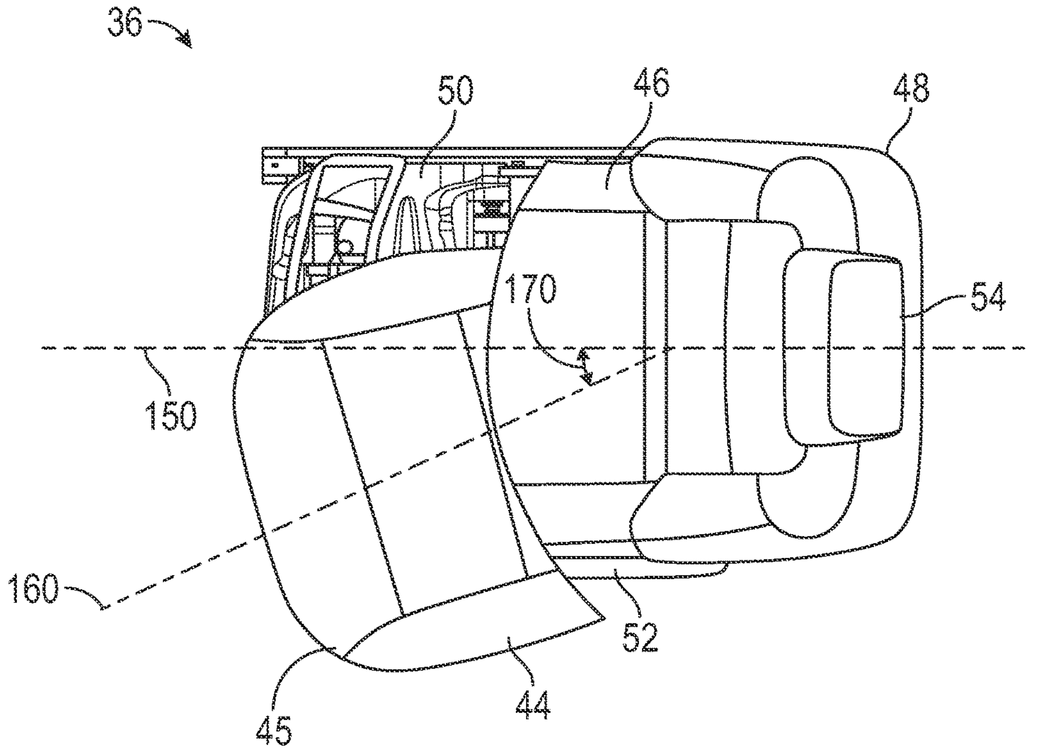
Figure 6:
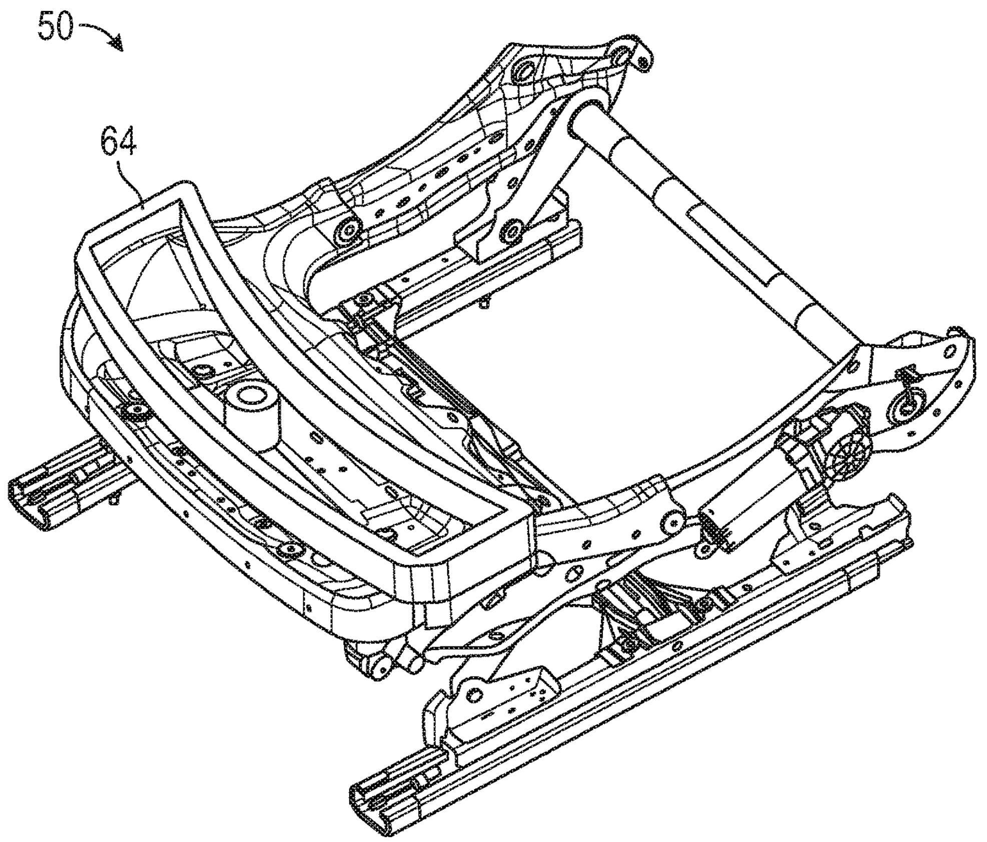
FIG. 6 is an isolated perspective view of a frame of the seat of FIGS. 1-5 in accordance with an example.
Figure 7:
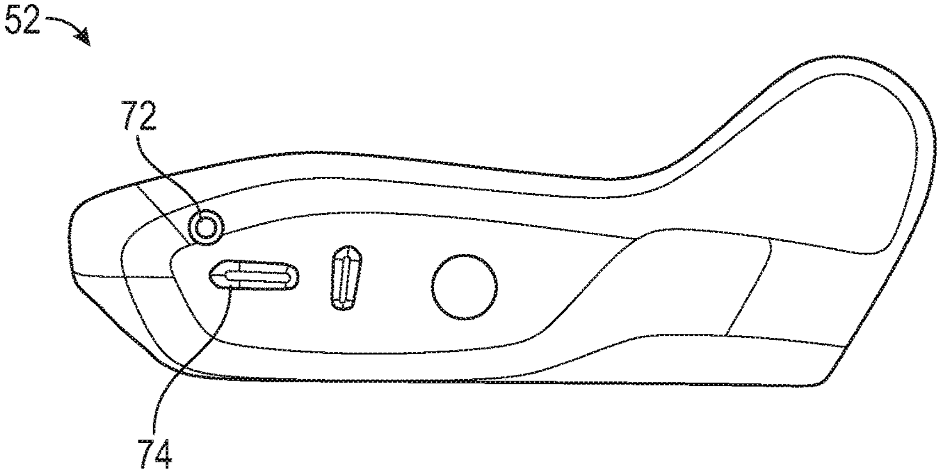
FIG. 7 is an isolated side view of a panel of the seat of FIGS. 1-5 in accordance with an example.

FIG. 4 presents the front portion 44, the rear portion 46, and the seatback 48 all aligned along a common first central axis 150 while the front portion 44 is in the driving position. In FIG. 5, the rear portion 46 and the seatback 48 are still aligned along the first central axis 150; however, the front portion 44 is disposed toward a side of the vehicle 10 in the boarding position and a second central axis 160 of the front portion 44 is at a non-parallel angle 170 from the first central axis 150. In various examples, the angle 170 may be about 15 to 45 degrees, such as 30 degrees, while the front portion 44 is in the boarding position.

Figure 8:
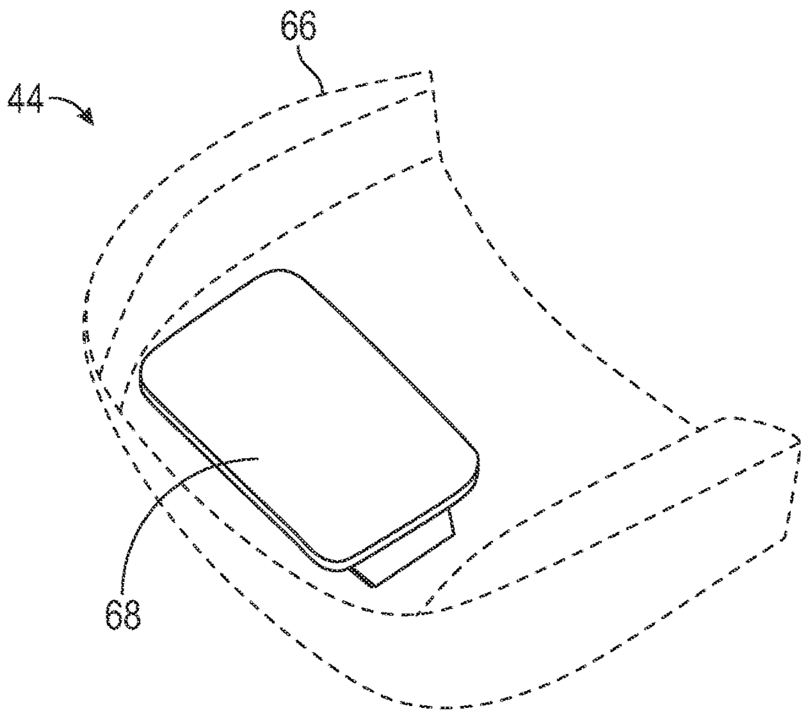
FIGS. 8 and 9 include isolated perspective views of a front portion of the seat cushion of the seat of FIGS. 1-5 from above and below, respectively, in accordance with an example.
Figure 9:
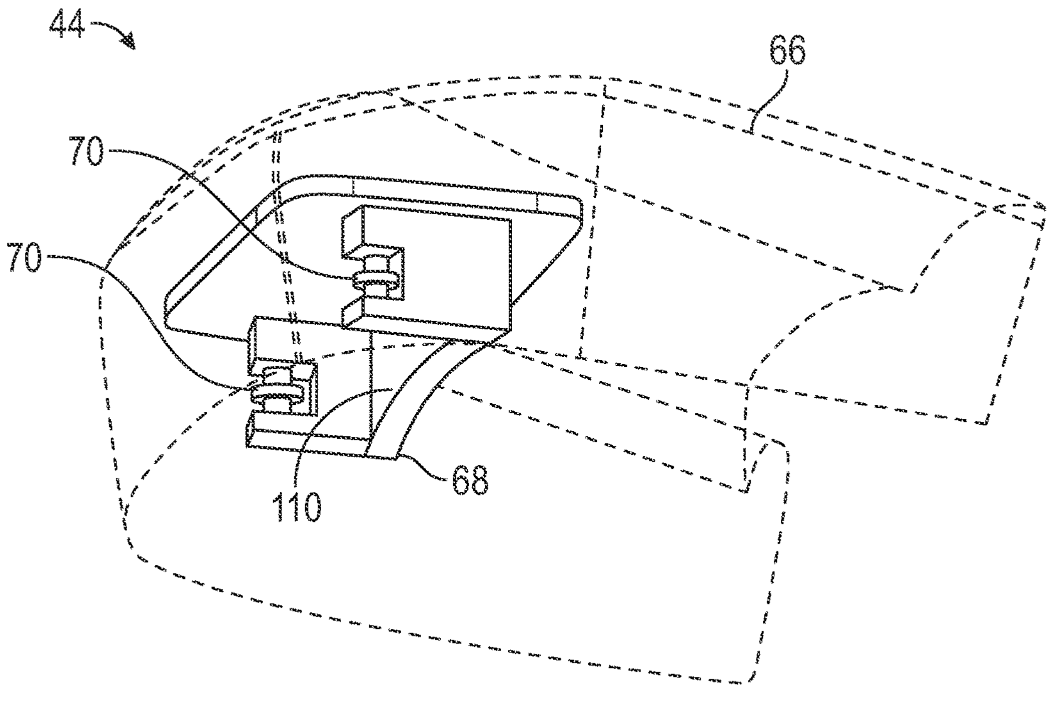
Figure 10:
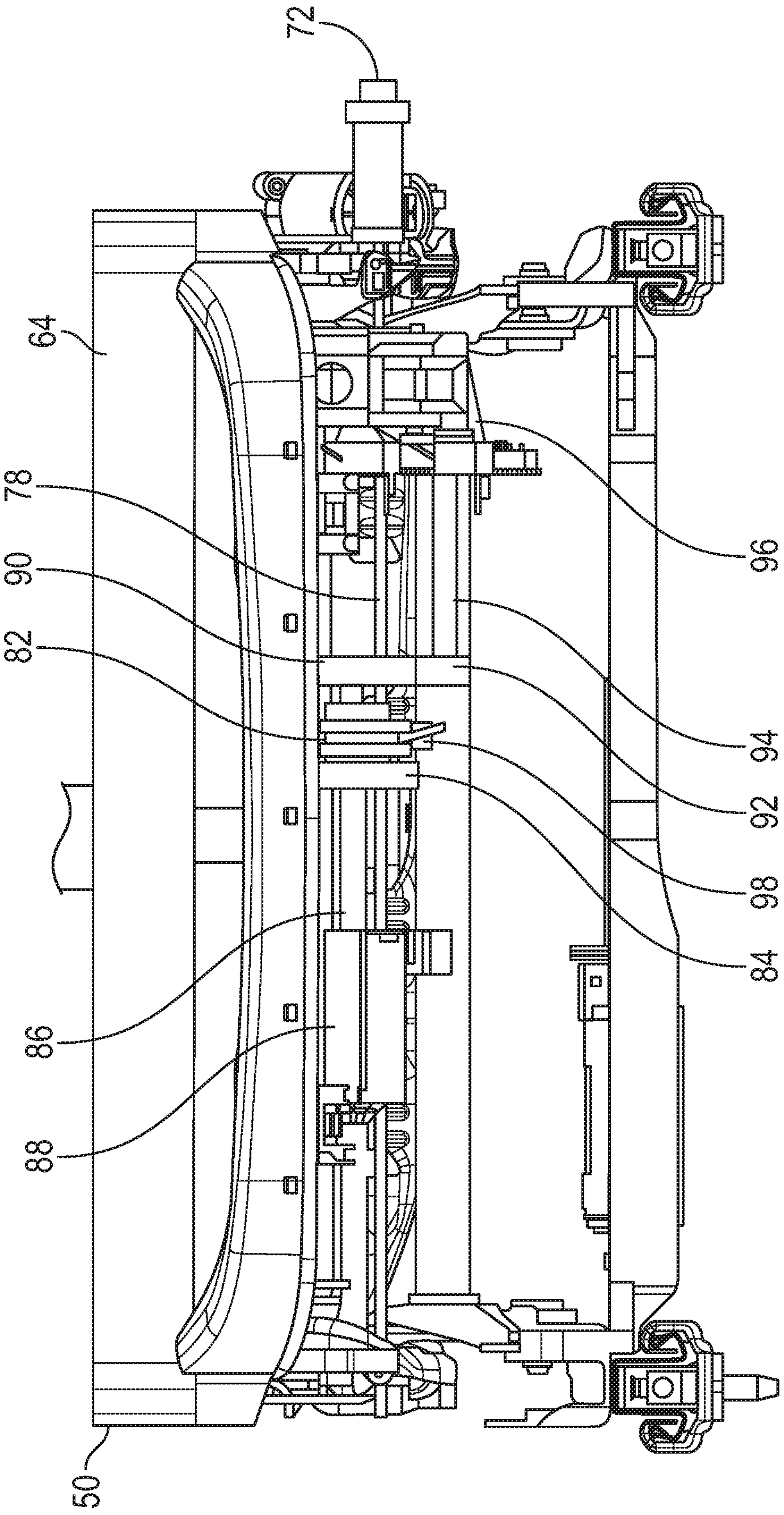
FIG. 10 is an isolated front view of a motorized gear system of the seat of FIGS. 1-5 in accordance with an example.
Figure 11:
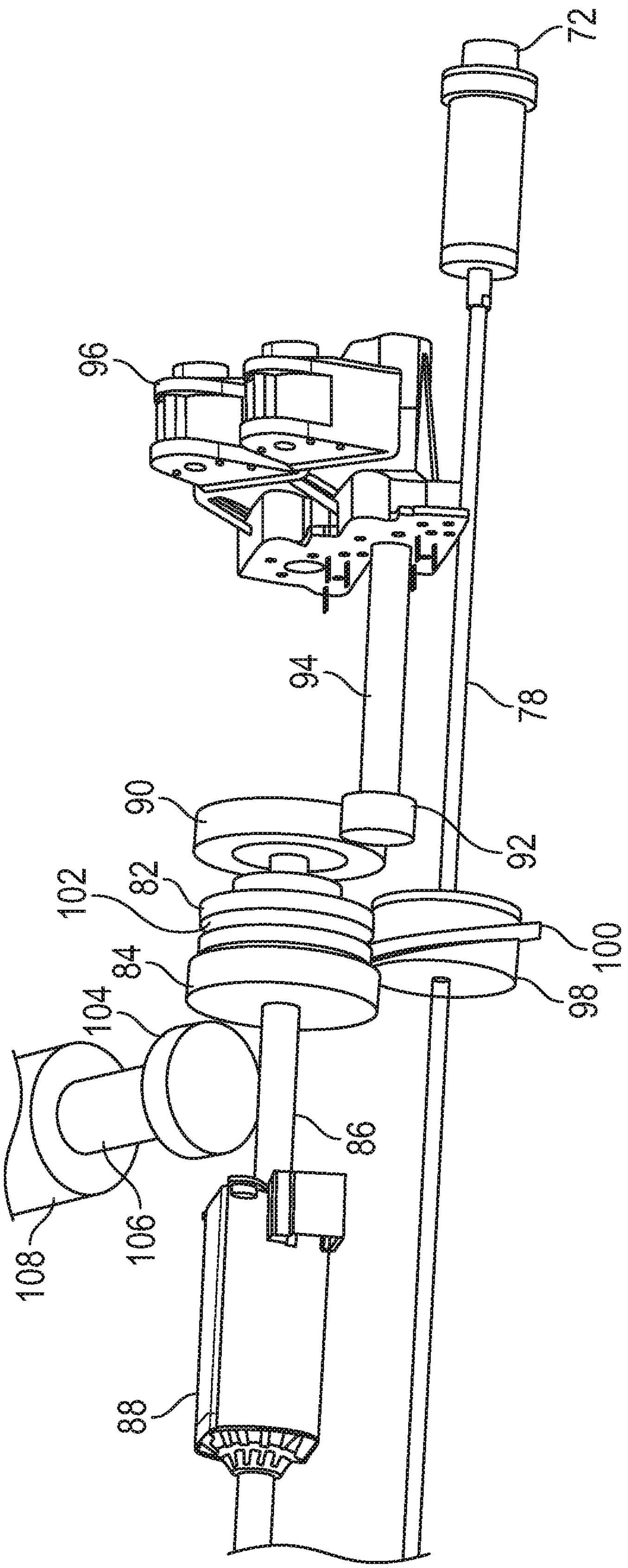
FIGS. 11, 12, 13, and 14 include various isolated views of certain components of the motorized gear system of FIG. 10 in accordance with an example.
Figure 12:
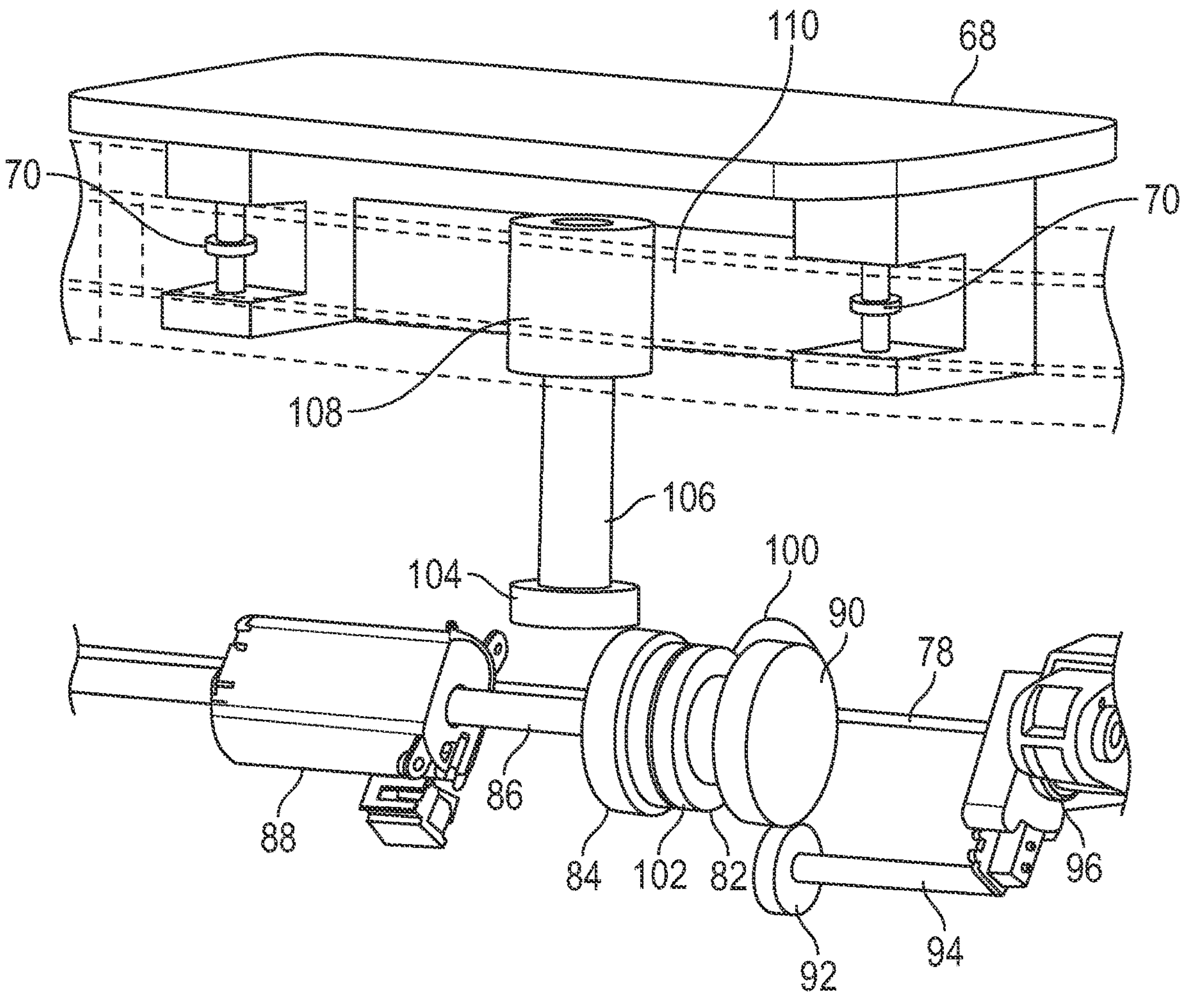

FIGS. 6-9 present various isolated components of the seat 36, including the frame 50 (FIG. 6), a side panel 52 (FIG. 7), and top and bottom views of the front portion 44 of the seat cushion 45 (FIGS. 8 and 9, respectively). FIG. 10 presents an isolated, front view of a motorized gear system configured to move the front portion 44 laterally along the frame 50. Additional isolated views of components of the motorized gear system are presented in FIGS. 11-14.

In general, the front portion 44 includes a front cushion 66 having a front bracket 68 secured to a lower portion thereof that is configured to move within a guide 64 of the frame 50. The front bracket 68 includes rollers or bearings 70 that are in contact with inner surfaces of the guide 64 and configured to rotate as the front bracket 68 moves within the guide 64. In various examples, the guide 64 directed the moving front portion 44 along a curved path of travel. Movement of the front portion 44 of the seat cushion 45 may be performed with a manual or motorized gear system. In this example, the front bracket 68 includes an arcuate or curved surface 110 having teeth (not shown) protruding from an inner surface thereof. The teeth of the curved surface 110 are configured to interlock and mate with teeth (not shown) of an inner gear 108. The inner gear 108 is functionally coupled to the motorized gear system by a shaft 106 and a first bevel gear 104.

The gear system includes a motor 88 coupled to a second bevel gear 84 by a shaft 86. The motor 88 is configured to rotate the shaft 86 and thereby rotate the second bevel gear 84. The second bevel gear 84 includes teeth (not shown) that interlock with and mate with teeth of the first bevel gear 104. Therefore, rotation of the second bevel gear 84 rotates the first bevel gear 104, thereby rotating the inner gear 108, and thereby moving the front bracket 68 along the guide 64. The direction of rotation of the shaft 86 determines the direction of movement of the front bracket 68.

In some examples, the gear system may function solely for lateral (swivel) movement of the front portion 44 of the seat cushion 45. However, in this example, the gear system has further functionality for raising and lowering the seat cushion 45 relative to the floor of the vehicle 10. To provide this function, the gear system includes a first height gear 90 coupled to the shaft 86, a second height gear 92 coupled to a second shaft 94, and a height adjustment mechanism 96 coupled to the second shaft 94. The first height gear 90 and the second height gear 92 each include teeth that are configured to interlock and mate. Therefore, rotation of the first height gear 90 rotates the second height gear 92, the second shaft 94, and operates the height adjustment mechanism 96 to move the seat 36 toward or away from the floor of the vehicle 10. The direction of rotation of the second shaft 94 determines the direction of movement of the seat 36.

The gear system may include various structures configured to selectively switch between the functions thereof, that is, movement of the front portion 44 laterally and movement of the seat cushion 45 vertically. In this example, the gear system includes a constant mesh gear assembly that includes the second bevel gear 84, the first height gear 90, and a transition gear 82 therebetween. The constant mesh gear assembly is configured to selectively transfer rotational power from the shaft 86 to either the second bevel gear 84 or the first height gear 90, while the other of the two remains stationary. To accomplish this, the transition gear 82 is configured to move between and individually contact the second bevel gear 84 or the first height gear 90 to selectively provide rotation thereto by the shaft 86 and the motor 88. That is, the shaft 86 only rotates one of the second bevel gear 84 and the first height gear 90 depending on which of the two is in contact with the transition gear 82. The transition gear 82 may contact and transfer rotation from the shaft 86 to the second bevel gear 84 or the first height gear 90 in various manners, such as by interlocking teeth or magnetic coupling.

Figure 13:
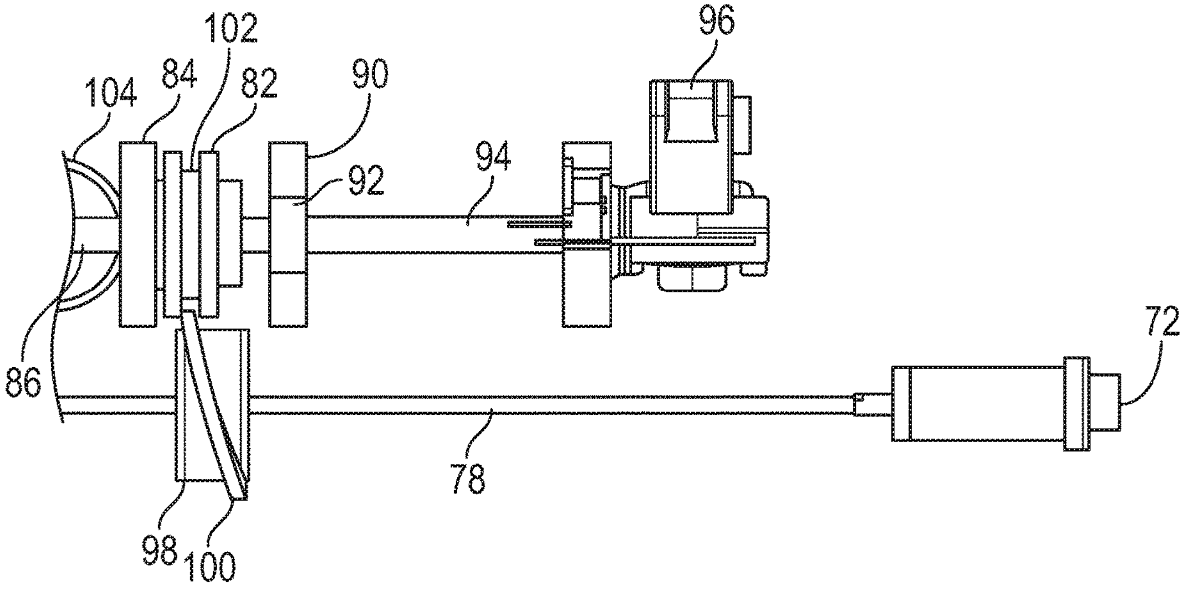
Figure 14:
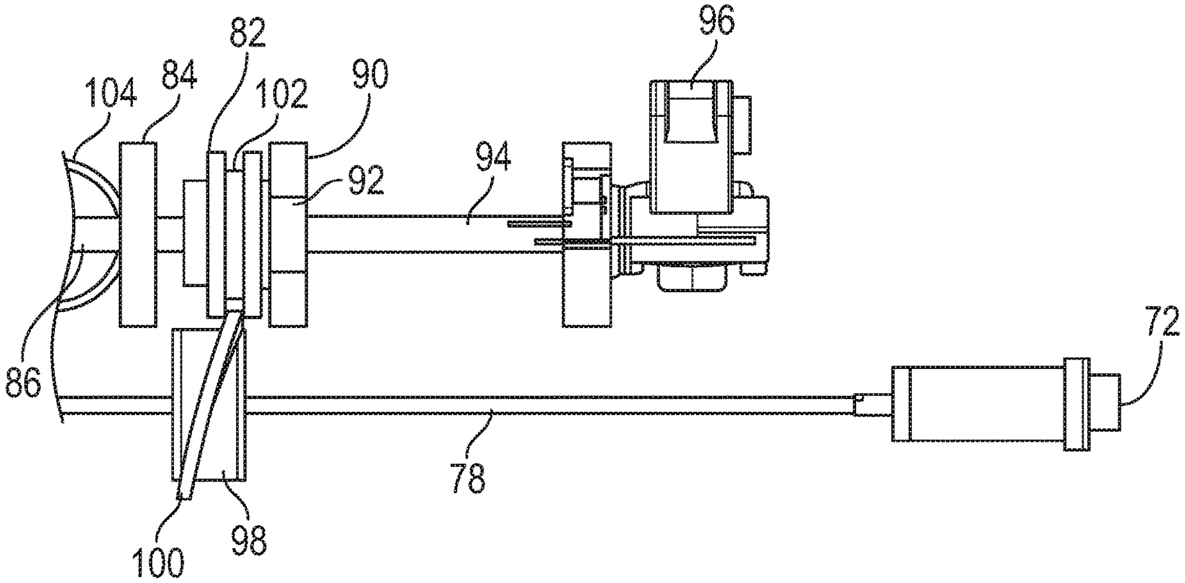

The position of the transition gear 82 may be adjusted with a gear shifting assembly that includes a gear shifter 98 fixed to a third shaft 78 and a spring-operated switch 72 configured to rotate the third shaft 78 by 180 degrees. The gear shifter 98 includes a protruding member 100 that is received within a channel 102 of the transition gear 82. The protruding member 100 continuously extends about a circumference of the gear shifter 98 and is angled thereon to be disposed adjacent a first end thereof at a first location thereon, and be disposed adjacent a second end thereof at a second location thereon that is opposite the first location. FIGS. 13 and 14 illustrate the operation of the gear shifting assembly. In FIG. 13, the transition gear 82 is in contact with the second bevel gear 84, and operation of the motor 88 causes lateral movement of the front portion 44 of the seat cushion 45. Articulation of the switch 72 causes the third shaft 78 and therefore the gear shifter 98 to rotate 180 degrees. As the gear shifter 98 rotates, a portion of the protruding member 100 in contact with the transition gear 82 transitions from the first location to the second location and pushes the transition gear 82 away from the second bevel gear 84 and toward the first height gear 90 until contact is made therewith, as shown in FIG. 14. In this arrangement, operation of the motor 88 causes vertical movement of the seat cushion 45.

Figure 15:
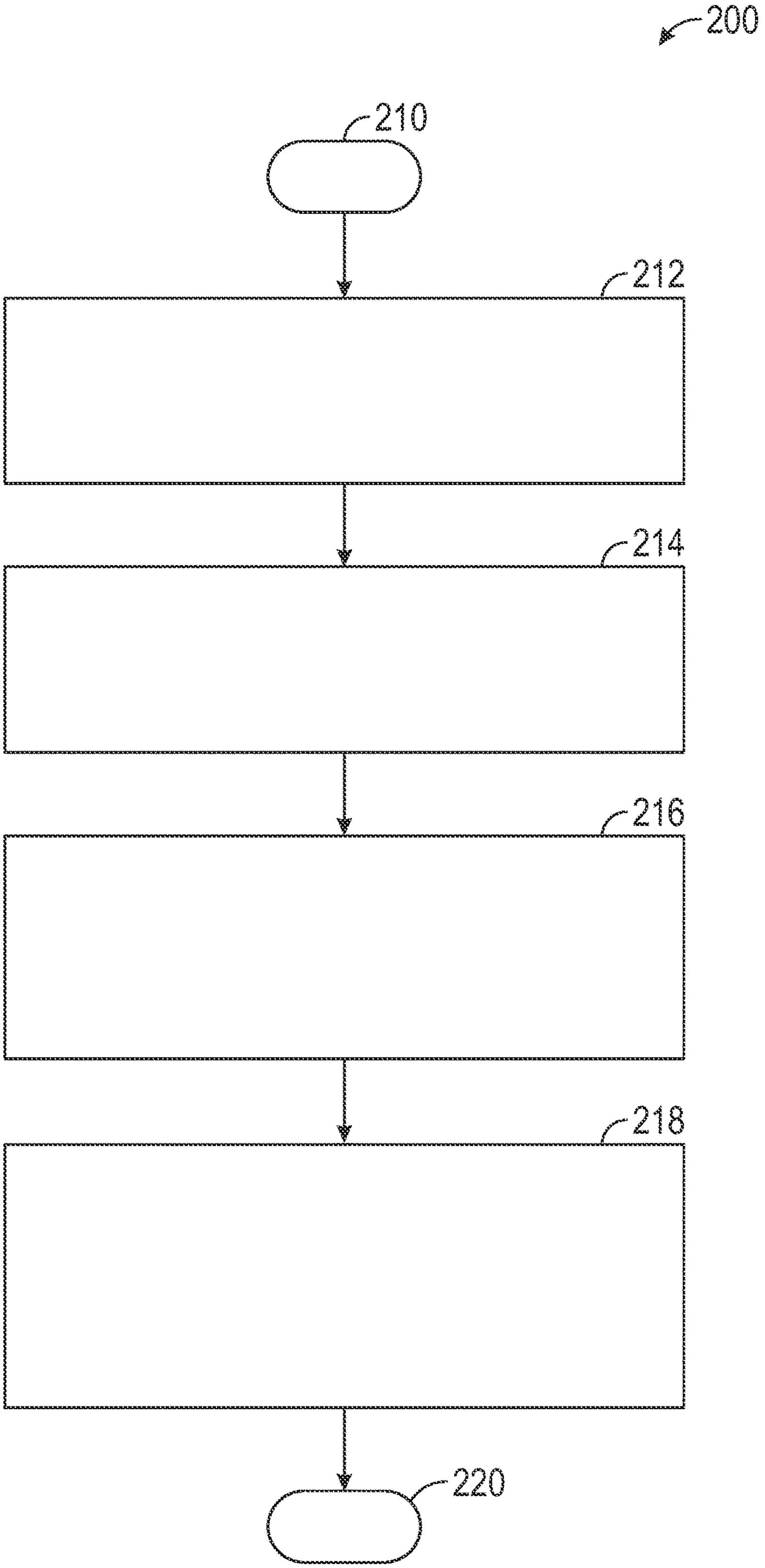
FIG. 15 is a flowchart illustrating a method of promoting access to a vehicle in accordance with an example.

With reference now to FIG. 15 and with continued reference to FIGS. 1-14, a flowchart provides a method 200 for promoting ease of access to a vehicle, such as performed by the seat 36, in accordance with various examples. As may be appreciated in light of the disclosure, the order of operation within the method 200 is not limited to the sequential execution as illustrated in FIG. 17, but may be performed in one or more varying orders as applicable and in accordance with the present disclosure. For convenience, the method 200 will be described in reference to the vehicle 10 and the seat 36, but the method 200 is not limited to this example.

In one example, the method 200 may start at 210. At 212, the method 200 may include transitioning the front portion 44 of the seat cushion 45 of the vehicle seat 36 from a driving position to a boarding position. Transitioning the front portion 44 includes moving the front portion 44 on the frame 50 toward a first side of the vehicle 10. If the transition gear 82 is in the vertical adjustment position, the switch 72 may be used to rotate the gear shifter 98 and move the transition gear 82 to the lateral adjustment position. A motor switch 74 may be used to activate the motor 88 and move the front portion 44 from the driving position, along the guide 64, to the boarding position. Alternatively, the motor 88 may be activated with a remote device, such as a key fob. In one example, the motor 88 may be activated by pressing and holding an unlock button of the key fob for a preprogrammed time, such as three to four seconds. In some examples, the door 60 must be open to provide sufficient space for the front portion 44 to reach the boarding position.

At 214, the method 200 may include supporting an individual with the front portion 44 of the seat cushion 45 while the individual is sitting thereon and while the front portion 44 is in the boarding position. For example, an individual may move from a sitting position on a wheelchair to a sitting position on the front portion 44. In some examples, ease of this maneuver is promoted by disposing the front portion 44 at least partially outside of the vehicle 10 while in the boarding position.

At 216, the method 200 may include transitioning the front portion 44 of the seat cushion 45 from the boarding position to the driving position by moving the front portion 44 of the seat cushion 45 on the frame 50 away from the first side of the vehicle 10 while the individual is sitting on the front portion 44. Similar to 212, the motor 88 may be activated by using the motor switch 74 or a remote device. In one example, the motor 88 is activated by pressing and holding a lock button of the key fob for a preprogrammed time, such as three to four seconds.

At 218, the method 200 may include supporting the individual with the front portion 44 of the seat cushion 45, the rear portion 46 of the seat cushion 45, and the seatback 48 of the vehicle seat 36 while the individual is sitting on the seat cushion 45 and while the front portion 44 is in the driving position. The method 200 may end at 220.

In some examples, certain operations of the seat 36 may be performed automatically in addition to, or as an alternative to, manual control. For example, a user intending to exit the vehicle 10 may manually initiate transition of the front portion 44 from the driving position to the boarding position, for example, by use of the motor switch 74. Once in the boarding position, the user may move from the front portion 44 to, for example, a wheelchair. In this situation, the controller 34 may determine, based on signals received thereby from one or more of the sensing devices 40*a*-40*n* (e.g., a pressure sensor) that the user is no longer sitting on the front portion 44. The controller 34 may then activate the motor 88 or activate one or more of the actuator devices 42*a*-42*n* to activate the motor 88, and thereby initiate the transition of the front portion 44 from the boarding position to the driving position automatically.

The systems and methods disclosed herein provide various benefits over certain existing systems and methods. For example, the systems and methods promote ease of access to a vehicle, especially for individuals with disabilities. Since only a portion of the seat cushion moves, the systems and methods may be implemented with limited components. This may reduce the cost of manufacturing the systems and methods, and may have other benefits such as a limited impact on the space within the vehicle and may have limited to no impact on adjacent systems and components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A method for promoting ease of access to a vehicle, the vehicle having a front, a rear, and oppositely disposed sides, the method comprising:

transitioning a front portion of a seat cushion of a vehicle seat from a driving position to a boarding position, wherein the seat cushion is coupled to a frame and the frame is coupled to a floor of the vehicle seat, wherein the seat cushion includes a front portion movably coupled to the frame that defines a forwardmost portion of the seat cushion and a rear portion fixed to the frame that defines a remainder of the seat cushion and is disposed in a fixed position between the front portion and a seatback of the vehicle seat, wherein transitioning the front portion includes moving the front portion laterally along a curved path of travel toward a first side of the sides of the vehicle while the rear portion remains in the fixed position, wherein the curved path of travel is defined by a guide of the frame and the front portion of the vehicle seat includes a bracket secured to a lower portion thereof that is configured to move within the guide;

supporting an individual with the front portion of the seat cushion while the individual is sitting thereon and while the front portion is in the boarding position;

transitioning the front portion of the seat cushion from the boarding position to the driving position while the individual is sitting on the front portion by moving the front portion of the seat cushion laterally away from the first side of the vehicle; and supporting the individual with the front portion of the seat cushion, the rear portion of the seat cushion, and the seatback of the vehicle seat while the individual is sitting on the seat cushion and while the front portion is in the driving position.

2. The method of claim 1, wherein the front portion of the seat cushion is entirely within the vehicle while the front portion is in the driving position, wherein the front portion of the seat cushion is at least partially outside of the vehicle while the front portion is in the boarding position.

3. The method of claim 1, wherein transitioning the front portion of the seat cushion from the driving position to the boarding position and transitioning the front portion of the seat cushion from the boarding position to the driving position are both motorized processes initiated by actuation of a motor switch positioned on the vehicle seat.

4. The method of claim 1, wherein transitioning the front portion of the seat cushion between the driving position and the boarding position is a motorized process, wherein transitioning the front portion of the seat cushion from the driving position to the boarding position includes pressing and holding an unlock button on a key fob of the vehicle for a first programmed time, and transitioning the front portion of the seat cushion from the boarding position to the driving position includes pressing and holding a lock button on the key fob for a second programmed time.

5. The method of claim 1, further comprising:

transitioning the front portion of the seat cushion from the driving position to the boarding position while the individual is sitting on the front portion;

determining, with one or more processors of a controller onboard the vehicle, that the individual is no longer sitting on the front portion based on signals received from a pressure sensor of the vehicle; and automatically transitioning the front portion of the seat cushion from the boarding position to the driving position upon determining that the individual is no longer sitting on the front portion while the front portion is in the boarding position.

6. The method of claim 1, further comprising switching a gear system of the vehicle seat from a first arrangement configured for transitioning the front portion of the vehicle seat between the driving position and the boarding position to a second arrangement configured for adjusting a height of the seat cushion relative to the floor of the vehicle.

7. A vehicle seat, comprising:

a frame coupled to a floor of a vehicle, the vehicle having a front, a rear, and oppositely disposed sides;

a seatback coupled to the frame and configured to support a back of an individual while the individual is sitting on the vehicle seat; and a seat cushion coupled to the frame and configured to support the individual while the individual is sitting on the vehicle seat, wherein the seat cushion includes a front portion movably coupled to the frame that defines a forwardmost portion of the seat cushion and a rear portion fixed to the frame that defines a remainder of the seat cushion and is disposed in a fixed position between the front portion and the seatback, wherein the front portion is configured to selectively transition from a driving position to a boarding position by laterally moving the front portion along a curved path of travel toward a first side of the sides of the vehicle while the rear portion remains in the fixed position, wherein the curved path of travel is defined by a guide of the frame and the front portion of the vehicle seat includes a bracket secured to a lower portion thereof that is configured to move within the guide, wherein the front portion is configured to support the individual thereon while transitioning between the boarding position and the driving position.

8. The vehicle seat of claim 7, wherein the front portion of the seat cushion is configured to be disposed entirely within the vehicle while the front portion is in the driving position, wherein the front portion of the seat cushion is configured to be disposed at least partially outside of the vehicle while the front portion is in the boarding position.

9. The vehicle seat of claim 7, further comprising:

a motorized gear system configured to move the front portion between the driving position and the boarding position; and a motor switch positioned on the vehicle seat that is configured to initiate the motorized gear system.

10. The vehicle seat of claim 7, further comprising:

a motorized gear system configured to move the front portion between the driving position and the boarding position; and a key fob of the vehicle configured to initiate the motorized gear system, wherein pressing and holding an unlock button on a key fob of the vehicle for a first programmed time causes the motorized gear system to transition the front portion from the driving position to the boarding position, and pressing and holding a lock button on the key fob for a second programmed time causes the motorized gear system to transition the front portion from the boarding position to the driving position.

11. The vehicle seat of claim 7, further comprising:

a pressure sensor configured to sense whether the individual is sitting on the front portion of the seat cushion; and a controller configured to, by one or more processors:

determine that the individual was sitting on the front portion of the seat cushion while the front portion transitioned from the driving position to the boarding position based on signals received from the pressure sensor;

determine that the individual is no longer sitting on the front portion while the front portion is in the boarding position based on the signals from the pressure sensor; and automatically transitioning the front portion of the seat cushion from the boarding position to the driving position upon determining that the individual is no longer sitting on the front portion while the front portion is in the boarding position.

12. The vehicle seat of claim 7, further comprising:

a motorized gear system configured to operate in a swivel mode to laterally move the front portion between the driving position and the boarding position and operate in a height adjustment mode to move the seat cushion toward or away from the floor of the vehicle; and a motor switch configured to initiate the motorized gear system, wherein the swivel mode and the height adjustment mode are both driven by a common shaft of the motorized gear system.

13. A vehicle, comprising:

a body having a cabin defined between a front, a rear, and oppositely disposed sides, a floor, and a roof of the body;

at least one door that provides access to the cabin of the body; and a vehicle seat, comprising:

a frame coupled to the floor of the body;

a seatback coupled to the frame and configured to support a back of an individual while the individual is sitting on the vehicle seat; and a seat cushion coupled to the frame and configured to support the individual while the individual is sitting on the vehicle seat, wherein the seat cushion includes a front portion movably coupled to the frame that defines a forwardmost portion of the seat cushion and a rear portion fixed to the frame that defines a remainder of the seat cushion and is disposed in a fixed position between the front portion and the seatback; and a motorized gear system configured to selectively transition the front portion from a driving position to a boarding position by laterally moving the front portion toward a first side of the sides of the vehicle while the rear portion remains in the fixed position, wherein the motorized gear system is configured to operate in a swivel mode to transition the front portion between the driving position and the boarding position and operate in a height adjustment mode to move the seat cushion toward or away from the floor of the vehicle, wherein the vehicle includes a shifting switch configured to switch the motorized gear system between the swivel mode and the height adjustment mode, wherein the swivel mode and the height adjustment mode are both driven by a common shaft of the motorized gear system.

14. The vehicle of claim 13, further comprising:

a pressure sensor configured to sense whether the individual is sitting on the front portion of the seat cushion; and a controller configured to, by one or more processors:

determine that the individual was sitting on the front portion of the seat cushion while the front portion transitioned from the driving position to the boarding position based on signals received from the pressure sensor;

determine that the individual is no longer sitting on the front portion while the front portion is in the boarding position based on the signals received from the pressure sensor; and automatically transitioning the front portion of the seat cushion from the boarding position to the driving position upon determining that the individual is no longer sitting on the front portion while the front portion is in the boarding position.

15. The method of claim 1, wherein, while the front portion is in the driving position, the front portion, the rear portion, and the seatback are aligned along a common first central axis extending between the front of the vehicle to the rear of the vehicle, wherein, while the front portion is in the boarding position, the rear portion and the seatback are aligned along the first central axis and the front portion is oriented along a second central axis that is at a nonparallel angle of 15 to 45 degrees from the first central axis.

16. The method of claim 1, wherein the curved path of travel is substantially horizontal.

17. The vehicle seat of claim 7, further comprising:

a height adjustment mechanism configured for adjusting a height of the seat cushion relative to the floor of the vehicle by vertically moving the vehicle seat toward and away from the floor of the vehicle;

a motor; and a gear system that includes:

a shaft coupled to the motor and configured for rotation about a central axis thereof by operation of the motor;

a bevel gear disposed on the shaft that is functionally coupled with the front portion to convert rotation of the shaft to lateral movement of the front portion;

a height gear disposed on the shaft that is functionally coupled with a height adjustment mechanism to convert rotation of the shaft to vertical movement of the vehicle seat via the height adjustment mechanism;

wherein transitioning the front portion between the driving position and the boarding position includes functionally coupling the bevel gear to the shaft for rotation therewith, and functionally decoupling the height gear from the shaft to remain stationary during rotation of the shaft, and operating the motor to rotate the shaft and the bevel gear thereon and thereby move the front portion laterally toward the side of the vehicle, wherein the direction of rotation of the shaft determines the direction of lateral movement of the first portion;

wherein adjusting the height of the front portion includes functionally coupling the height gear to the shaft for rotation therewith, and functionally decoupling the bevel gear from the shaft to remain stationary during rotation of the shaft, and operating the motor to rotate the shaft and the height gear thereon and thereby raise or lower the front portion, wherein the direction of rotation of the shaft determines the direction of vertical movement of the first portion.

18. The vehicle seat of claim 16, wherein the gear system includes:

a transition gear configured to move between and individually couple with the bevel gear or the height gear to selectively provide rotation thereto by the shaft and the motor; and a gear shifting assembly that includes a gear shifter configured to move the transition gear between contact with the bevel gear and the height gear, wherein the gear shifting assembly includes:

a gear shifter that includes a protruding member that is received within a channel of the transition gear, wherein the protruding member continuously extends about a circumference of the gear shifter and is angled thereon to be disposed adjacent a first end thereof at a first location thereon, and be disposed adjacent a second end thereof at a second location thereon that is opposite the first location; and a switch configured to, in response to actuation thereof, initiate rotation of the gear shifter by 180 degrees and thereby move the transition gear between contact with the bevel gear and the height gear.

19. The vehicle seat of claim 7, wherein, while the front portion is in the driving position, the front portion, the rear portion, and the seatback are aligned along a common first central axis extending between the front of the vehicle to the rear of the vehicle, wherein, while the front portion is in the boarding position, the rear portion and the seatback are aligned along the first central axis and the front portion is oriented along a second central axis that is at a nonparallel angle of 15 to 45 degrees from the first central axis.

20. The vehicle seat of claim 7, wherein the curved path of travel is substantially horizontal.

* * * * *